June 7, 1927.  E. T. FERNGREN  1,631,805
DRAWING SHEET GLASS
Filed May 15, 1924  2 Sheets-Sheet 1
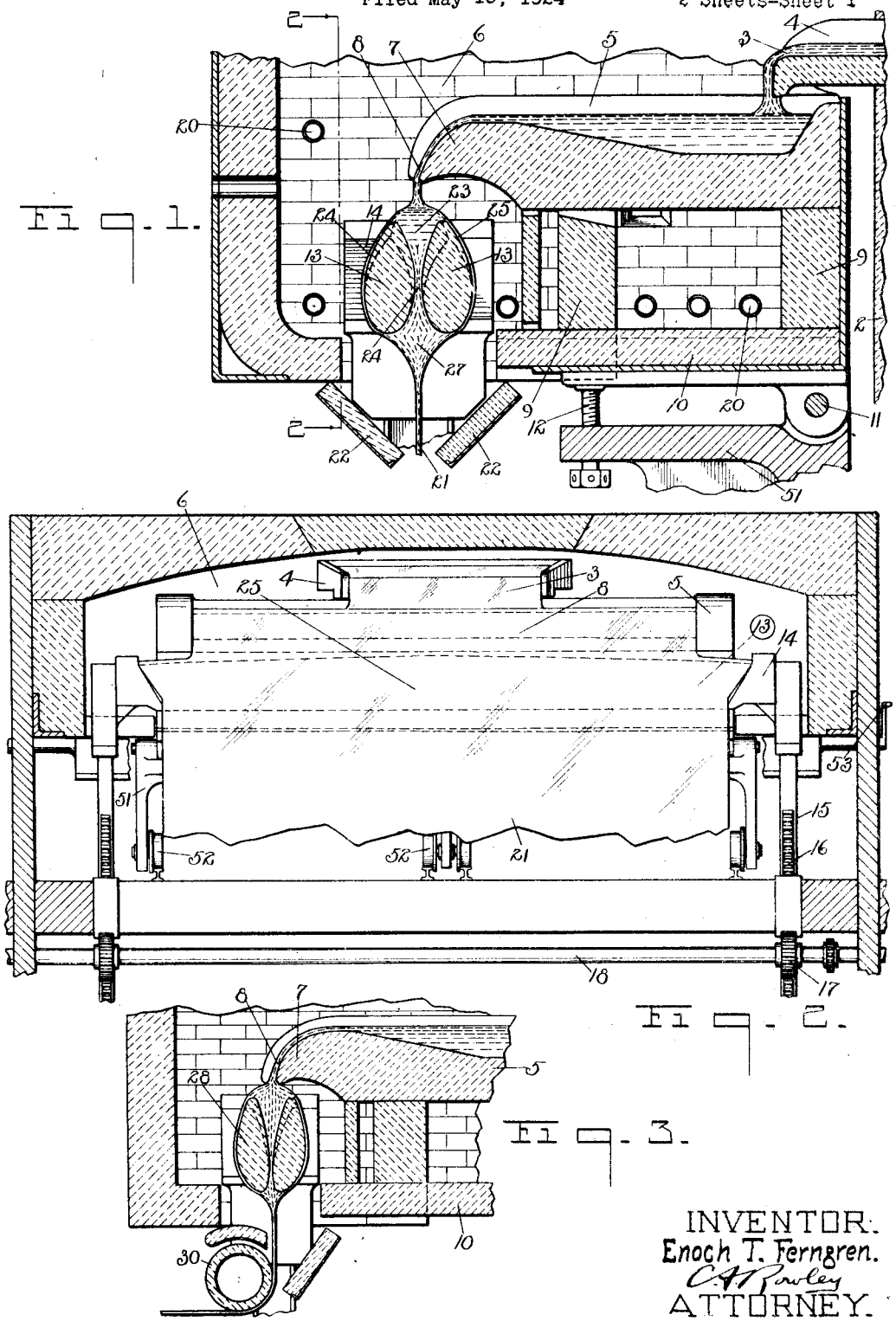
INVENTOR.
Enoch T. Ferngren.
ATTORNEY.

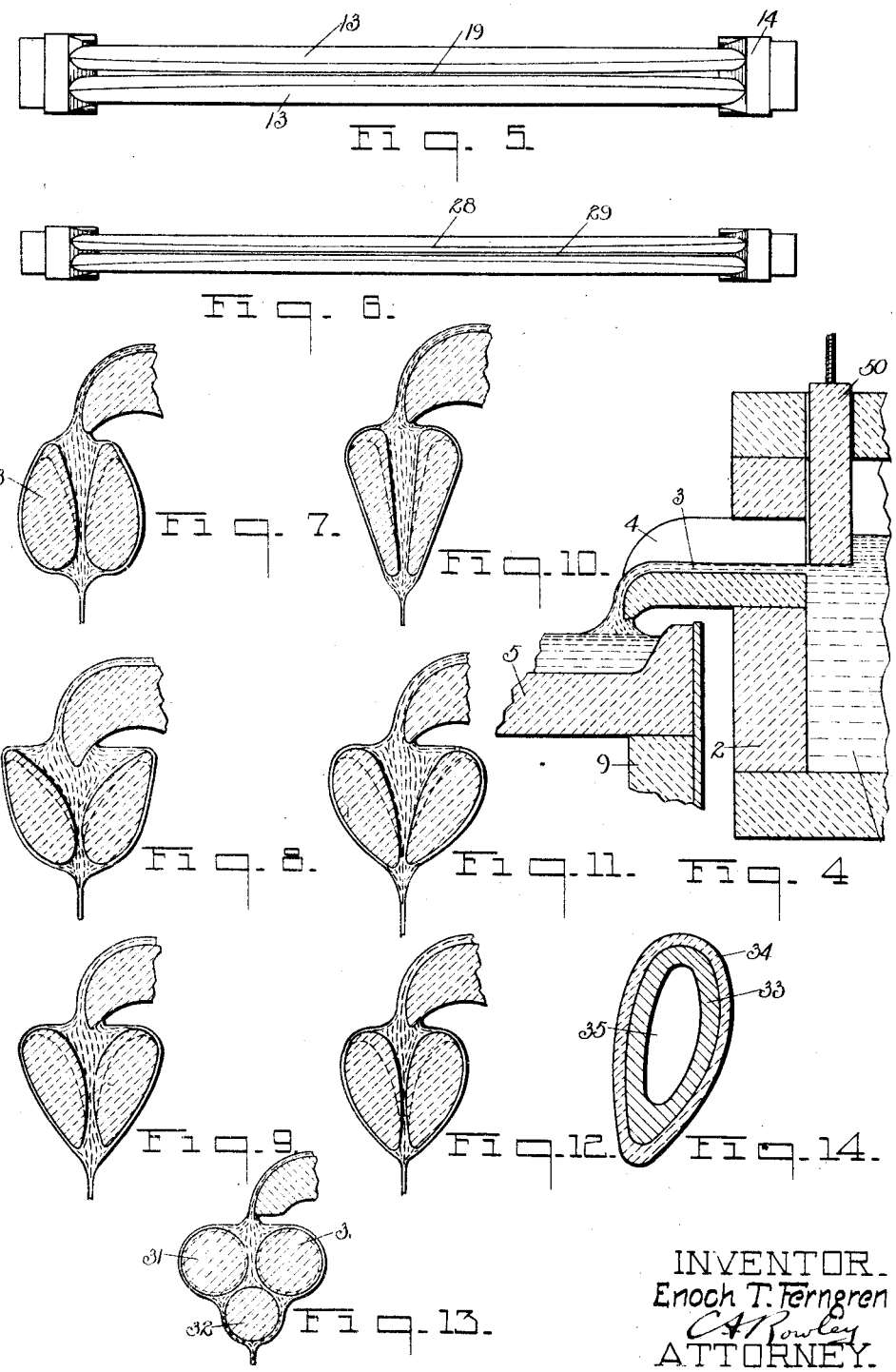

Patented June 7, 1927.

1,631,805

UNITED STATES PATENT OFFICE.

ENOCH T. FERNGREN, OF TOLEDO, OHIO, ASSIGNOR TO THE LIBBEY-OWENS SHEET GLASS COMPANY, OF TOLEDO, OHIO, A CORPORATION OF OHIO.

DRAWING SHEET GLASS.

Application filed May 15, 1924. Serial No. 713,447.

This invention relates to the art of making sheet glass, and more particularly to an improved method and apparatus for flowing and drawing glass downwardly into flat sheet form.

According to this invention, molten glass flows from the source of supply into a comparatively shallow pot or distributing vessel, from which it overflows in a relatively thin even stream at one edge thereof. This downwardly discharging stream of molten glass is caught between a pair of similar, substantially parallel, directing or controlling members, a portion of the molten glass flowing downwardly between the members and the remainder overflowing the upper edges of the members and flowing around the outer sides thereof to unite below the members with the stream flowing downwardly therebetween. These directing members vary in their cross-sectional size and configuration, symmetrically from their centers toward either end, in such a manner as to make possible a practical and accurate control over the temperature, viscosity, volume and flow velocity of the molten glass at all points in its path of advance to supply the sheet formation, as well as the drawing strains in the sheet drawn downwardly therefrom, at all points across the width of the sheet.

The above and other objects and advantages of the invention will be more clearly understood from the following detailed description of certain approved forms of the apparatus.

In the accompanying drawings:

Fig. 1 is a longitudinal vertical section through the main portions of the apparatus.

Fig. 2 is a transverse vertical section taken substantially on the line 2—2 of Fig. 1. This view is on a smaller scale than Fig. 1.

Fig. 3 is a view similar to Fig. 1, on a smaller scale, of a somewhat modified form of the apparatus.

Fig. 4 is a longitudinal vertical section through the tank connections for supplying molten glass to the distributing pot. This view shows substantially a continuation of the right-hand end of Fig. 1.

Fig. 5 is a plan view of the directing members shown in Figs. 1 and 2, on a smaller scale.

Fig. 6 is a corresponding view of the directing members shown in Fig. 3.

Figs. 7 to 14, inclusive, show sections through modified forms of these flow directing members.

Referring first to Figs. 1, 2, 4 and 5, a supply of molten glass 1 is produced and maintained in a tank furnace such as 2. At the discharge end of this tank a shallow stream of molten glass 3 may flow out through the passage or spout 4, the volume of this discharge being regulated by the vertically adjustable gate or shear-cake 50. The stream of glass 3 discharges into the shallow container or distributing pot 5 mounted in the heating chamber 6. Pot 5 is closed at three sides but is provided with an overflow lip 7 at one end over which the molten glass flows in a thin even stream 8. Pot 5 is supported on suitable cross blocks or partitions 9, carried by a supporting base 10 which is pivoted at one end 11 to a lower vehicular base 51, mounted on wheels 52, so that the opposite end where the overflow spout 7 is positioned may be raised or lowered as desired to vary the rate and volume of free drop or fall of the discharging stream 8 from the tip of the lip 7. The forward end of the pot assembly opposite the pivot point is supported upon an adjusting screw 12 in the movable base 11, whereby the inclination of the pot 5 may be varied to suitably vary the transit movement and quantity of glass maintained therein relative to inflow or outflow as conditions may determine. By tipping the pot 5 sufficiently the entire pool of molten glass therein may be poured out in case it is desired to clean or replace the pot. In this case the flow of glass from tank 2 should be cut off by lowering the gate 50 completely across the discharge passage 4.

The pot 5 thus functions as a pouring ladle, which when fixed at a certain angle will always contain a certain quantity of glass, and the stream 8 discharging therefrom, while being wider than the stream 3 received in the pot, will always represent the same quantity of glass in movement.

The quantity constant of glass which is maintained in the pot 5 has a bearing on the viscosity of the glass and its relative discharging stream line velocity across lip 7, due to the fact that the shallower the depth of glass becomes in the pot a lesser proportion of the heat volume of the glass solution will be retained.

When molten glass loses its originally contained heat, the viscosity of the glass solution increases and mobility decreases, thus making it possible, by tipping the pot 5, to maintain the proper degree of viscosity in stream 8 independent of fluctuations of temperature in the furnace, and also enabling the retention of sufficient heat to insure the maintenance within certain limits of the most suitable condition of viscidity in the lower portion of stream 8 relative to the demands in this respect of the sheet forming operation.

The downwardly flowing stream of glass 8 is caught between a pair of horizontal, substantially parallel, directing bars or flow-controlling members 13, which are supported at their opposite ends in blocks 14, carried at the upper ends of vertically adjustable columns or pillars 15, provided with racks 16 engaging with gears 17 on a horizontal adjusting shaft 18, which shaft is mounted beneath the furnace floor level. Suitable means are provided to rotate shaft 18 and lock it in any desired position. By rotating this shaft the bars or directing members 13 may be actuated in unison and raised or lowered as desired.

As indicated in Figs. 1 and 5, the members 13 are substantially egg-shaped in cross-section with the more pointed ends projecting upwardly. The members are higher at their central portions than adjacent the ends and so shaped on their adjacent sides that the passage 19 between the members will be narrower at the central portion of the bars than it is between the end portions. In any vertical transverse plane the cross-sections of the two members will be substantially identical, except that one is the reverse of the other, that is, one is left-handed and the other right-handed. Also the members vary equally in configuration from their central points toward either end, in other words, a cross-section taken one foot from one end of the members will be the same as a cross-section taken one foot from the other end. The reasons for these relative proportions and configurations will be explained hereinafter.

The entire assembly comprising the distributing pot 5, its supporting members, and the directing bars 13 and their supports, are enclosed in a heating chamber, 6, which is maintained at the necessary high temperature by a series of burners 20 projecting thereinto at various locations. Some of these burners direct their heat between the supports 9 beneath the pot 5 to maintain the molten glass therein at the proper working temperature. The heated gases may also pass up around the sides of the pot 5, to prevent as far as possible excessive cooling of the edge portions of the molten pool in the pot. The bottom of chamber 6, beneath the directing members 13, is open to give freedom for vertical movement to the columns 15 and member 13, and to allow the glass sheet 21 to flow or to be drawn downwardly. This open passage may be closed or is more or less obstructed by the heat radiating closures or shields 22, to suitably vary the heat conditions affecting the source of sheet 21 and its forming zone. Shields 22 are pivotally mounted through the side walls of chamber 6, and may be adjusted by cranks 53.

When molten glass is flowed in stream form through a directing passage, there is always present a tendency for the central portions of the stream to acquire a greater volume and velocity than the side portions. The side portions are somewhat cooled, and thus rendered more sluggish by the adjacent portions of the containing vessel, and these retaining walls also act to frictionally retard the flow. For this reason there will be a freer flow of glass at the central portion of the glass stream 8 discharged over lip 7. To compensate for this the central portions of directing bars 13 are higher than the end portions. In this way there is less drop from lip 7 to the central portions of these bars than there is from lip 7 to the end portions. This greater drop at the ends tends to increase the velocity of the edge portions of the stream. At the same time, due to their greater size and surface area, and also their configuration, the central portions of bars 13 offer a greater clinging surface to the glass flowing thereover and consequently retard the downward flow more at the central portions of the downwardly progressing mass of fluid glass than adjacent the edge portions thereof.

As will be noted the glass stream 8 is caught between the two bars 13 to form an upper supply or reservoir of glass 23 between the two bars. A portion of this glass flows downwardly through slot 19 between the bars or directing members as indicated at 24. Since this slot, on account of its retarding effect as related to the capacity for adhesiveness of the glass at different points in supply body 23, is inadequate to provide a passage for all of the glass, a certain portion of it will overflow around the outer sides of the two members in the form of streams 25. The streams 24 and 25 merge beneath the two directing bars as at 27, and from this suspended mass of glass the sheet 21 is advanced or drawn downwardly in any approved manner.

Since the more central portion of the mass of glass 23 caught in the trough like passage between the two members 13 is temporarily retarded in its downward progression, because of the extent and adjacency of the supporting surfaces and the quantity and column of glass between the members portions of this glass will flow sidewise in the trough between the members because the trough passage slopes or inclines along a downward gradient toward either end thereof thus increasing the width of the sheet source and making the glass sheet 21 wider than the stream 8 discharged from distributing pot 5. As indicated in Fig. 5 the passage 19 between the members 13 is also more open and wider at its ends than it is at the central portion thus providing a further means for maintaining a constant lateral glass movement within the sheet source body and toward the opposite ends of the member 13, while facilitating the flow of the glass which forms the sheet edges.

In Figs. 3 and 6, the directing members 28 are given a somewhat different configuration than those shown at 13 in Fig. 1, being pointed downwardly and positioned so as to bring the lower edge of each member closer together, and in this case the passage 29 between the members slopes downward on an easy gradient from the center toward the opposite ends thereof, and becomes gradually wider toward said ends while the lower exit space therefor is of the same width from end to end thereof. This form is better adapted for relatively quick attenuation of the glass at the tapering end 27 for producing a thinner sheet. As shown in Fig. 3, the sheet may, while still plastic, be bent into the horizontal plane about a cooled bending roller such as indicated at 30.

When operating the apparatus to produce a continuous sheet of glass, the gate 50 is raised and a stream of molten glass is admitted to the pot 5 after first having brought the heating chamber enclosure, the pot, and the directing members 13 to the proper high temperature.

After the pot 5 is filled almost to the point of overflow at lip 7, the gate 50 is lowered until the stream 3 going through spout 4 is considerably reduced. While this is being done the shaft 18 is rotated to raise the columns 15 and thereby bring the upper edge of the directing members 13 close beneath the lip 7.

The glass stream 8 which now starts to discharge from lip 7 into the trough-like space between the directing members should be ample enough to fill this space to the point of overflowing before any appreciable flow occurs through the central passage or fissure 19, so that the depositing glass 23 will overflow the outer sides of the members 13, and the outside streams thus formed will join the central stream as it fills the widening-out space below the fissure or passage 19, thus insuring that the confluent movement of the glass toward the center of gravity will be speedily established.

As soon as the confluent taper 27 of the merging flows has come into being, an elastic resistance zone will form in this glass beneath the lower ridges of each member 13 due to the pull the weight of this glass exerts on the glass which is supported by the upper side of each member and on that glass which is anchored to or clings to all the surfaces of the members.

This elastic resistance may be said to constitute the sum total of all the lines of tension established between the points of grip and of support of the glass on the directing members, and the center of weight and gravity action of the depending and descending tapering portion 27.

The gravity action will cause a rapid attenuation in the lower portion of the tapering glass 27 relatively close to the members and this attenuating portion of the flow constitutes the beginning of the sheet area 21.

The sheet formation now forming may be intercepted, bent and carried horizontally as indicated in Fig. 3 by any approved mechanism for such purpose, and from the bending point carried through the leer to the customary cutting table.

When a freely flowing sheet-like stream of glass is advanced from the vicinity of a number of clinging surfaces as shown in Fig. 1, and from along a space where several glass streams merge, it is usually the weight of the stream itself or so much of its freely depending portion as is unsupported during its descent, which supplies the pulling or drawing force that acts to constantly separate and spin out the needed quantity of glass from the merging stream in the vicinity of the clinging surfaces.

Thus the vertical extent 21 of otherwise unsupported sheet area shown in Fig. 1, which is suspended or hangs from the confluent taper 27 of the clinging glass streams, by its unit weight alone independent of supplemental drawing force applied thereto, can determine the amount of tractive force which shall operate in the fluent taper of the merging streams and thereby fix the thickness of the sheet.

Usually very little attenuation will occur within the plastic or the set sheet area, except in the upper portion thereof immediately adjacent the tapering point of the glass 27, so that by locating this thickness determining zone of the forming sheet area in which the drawing stress is mainly active, further away from or closer to the point of bend of the sheet area from its vertical path, or such points of support which may otherwise be given thereto, different weights and lengths of suspended sheet area will be made available as a pulling force on the glass along the attenuation zone, and to this extent act as a thickness determining factor.

Thus by locating the directing members 13 higher up in the heating chamber 6 than is shown in Figs. 1 and 3, more weight of the sheet area will act as a pull on the fluent glass and a thinner sheet and a faster drawing rate will result, and also the thinner glass stream will maintain its fluency and yieldability for a longer period on account of more sheet area being exposed to the heat energy of heating chamber 6.

On the other hand by locating the directing members 13 lower down in the heating chamber 6 than is shown in Figs. 1 and 3, or within the heat-reducing chamber formed between heat-radiating tiles 22, a thicker sheet will result on account of lesser weight or length of sheet between point 27 and any fixed bending or supporting point for the sheet, and also because of the reduced yieldability in the glass sheet at or below the attenuation zone proper due to the relatively cooling atmosphere which surrounds the sheet forming zone when thus located.

By bending and drawing the sheet about as shown in Fig. 3, and thereby adding the action of drawing force to the different lengths of sheet which may be had above the bending point, better practical results are obtained.

In order to obtain the required thickness of sheet the quantity movement of stream 8 should be regulated by adjusting the gate valve 50, the members 13 should be raised or lowered as the case may be, and the pot tilted correspondingly to maintain the correct distance between the pot and the members.

If the quantity movement of glass from the pot 5 to the members 13 is approximately correct, the sheet area 21 forming beneath the members will have nearly the thickness or thinness required. At this juncture, if the sheet formation is too thick, the members 13 should be elevated to increase the distance and square feet of sheet area between the members and the bending roll which will increase the weight of the sheet and promote attenuation in the sheet and in the taper 27.

The speed at which the made sheet is carried along may be approximately the same or less than its forming speed, but should preferably exceed that speed which would be produced by the weight pull of the sheet area by itself, to thereby add the stabilizing influence of a constant and uniform mechanical drawing pull to that exerted by the sheet, and this extra pulling force added, while taking away the sheet area, also to a degree will determine the thickness of sheet secured.

The use of supplemental drawing force which may be communicated by any approved mechanical means eliminates the necessity to effect changes in the temperature conditions in chamber 6 affecting the glass, the pot and the members 13, and also eliminates the need for a greater range of vertical adjustability of parts in order to produce different thicknesses of sheet by suspending greatly different weights or lengths of sheet beneath the attenuating taper 27.

The cooling conditions around the sheet area should be so maintained as to insure sufficient firmness of sheet after the required thickness and speed has been obtained, and any suitable means may be employed to attain this result.

The response of the glass which is moving downward over the bar members 13 to the movement controlling features of the bars, while said glass is under the influence of drawing pull, and the tension thereby generated, will normally produce an equal quantity advance along the entire lower reach of the bars or directing members. Such configurations of said members as shown in Figs. 1, 5 and 9, tends to produce a nearly equal quantity movement at all points of the taper 27, while the form shown in Figs. 3, 6, 7 and 10, while promoting equal quantity descent or discharge along the taper 27, works to establish a uniform gradient in tension through the forming zone of the sheet area, the maximum of tension being at the edges and the minimum being at the center of the sheet.

It may be noted that in all the different forms of directing members shown, the upper space portion of the trough between the members widens out towards the opposite ends, while at the same time the adjacent sides of the members become lower. This feature is provided for the reason that the glass flow delivering from lip 7 becomes slightly lower in temperature towards the ends of the members and therefore requires more body and more top surface exposure to surrounding heat to maintain the same heat volume and the same mobility along and between the end sections of the members as is possessed by the more fluent glass along the narrower trough section at the center of the members. Also there is generally a progressive increase in glass viscosity toward the side regions of the stream 8, wherefore, even with the larger body of glass at the opposite ends of the trough, there will be as much, and in some of the forms shown more, clinging support extended from the surfaces of the bar members 13 to this glass at their end portions as is given to the less viscid glass between the center regions of the bars.

To even out this difference in viscosity, fluid movement, and the clinging and adhering propensity of the glass, the passage or fissure 19 which defines the most narrow space portion between the bars 13 is made wider as shown in Fig. 5 directly beneath the wider space portion of the trough. On account of the general downward sloping of the trough from its center portion towards the ends thereof, the glass in this horizontal confining space is given a diagonal and lateral drift lengthwise of the trough. This breaks up all fixed stream line formations in the sheet supplying body or source before the downward taper 27 is formed, and the maximum stress lines forming within said taper are greatly diffused and covered by glass which is advancing under less stress tension. By this procedure practically all stress lines or markings in the sheet are avoided.

The various forms of directing bars, the cross-sections of which are shown in Figs. 7 to 12 inclusive, are adapted for glass compositions of different viscosity, mobility and heat-retaining capacity, and for producing different thicknesses and widths of sheet. The working principle is the same as that described hereinabove.

In Fig. 13, the two directing members 31 are of circular cross-section, tapering from the center toward either end, as in the previously described constructions. In this modification, an additional cylindrical member 32 is positioned beneath and between the members 31 to aid in bringing together and supporting the separate streams flowing into the sheet source.

In general these controlling bars or slabs are formed of some suitable refractory material such as fire-clay or porcelain, although they may be formed of a suitable heat-resisting metallic alloy. In Fig. 14, which shows a cross-section through one of these members, a central shell 33, which may be of metallic, metalloid or carbide structure, is surrounded with an outer casing 34 which may be formed of any suitable aluminous, siliceous or rare earth refractory material. The open passage 35 through the member decreases the weight, increases the strength and at the same time provides means for internally heating or cooling the directing members when such is found to be necessary in order to decrease or increase the viscosity of the glass and its capacity for adhering or clinging to the surfaces of members 13.

Claims:

1. In an apparatus for producing sheet glass, a pair of similar directing members between and around which molten glass flows to form the sheet, the members varying in cross-section symmetrically from their centers toward each end thereof.

2. In an apparatus for producing sheet glass, a pair of similar directing members between and around which molten glass flows to form the sheet, the members being substantial duplicates and varying in cross-section symmetrically from their centers toward each end thereof.

3. In an apparatus for producing sheet glass, a pair of similar directing members between and around which molten glass flows to form the sheet, the passage between the members being wider at the ends than at the center.

4. In an apparatus for producing sheet glass, a pair of similar directing members between and around which molten glass flows to form the sheet, each member being so shaped that greater clinging surface is provided for the glass at the centers of the members than adjacent the ends thereof.

5. In an apparatus for producing sheet glass, a pair of similar directing members between and around which molten glass flows to form the sheet, the members varying in cross-section symmetrically from their centers toward each end thereof, each member being so shaped that greater clinging surface is provided for the glass at the centers of the members than adjacent the ends thereof.

6. In an apparatus for producing sheet glass, a pair of similar directing members positioned in substantially parallel horizontal relation, with a passage therebetween which is wider at the top than at the bottom to form a glass receiving pocket and arranged and supported by means causing the glass to flow therebetween and over the sides and unite to form a sheet.

7. In an apparatus for producing sheet glass, a container for a supply of molten glass, including means for permitting a stream of molten glass to flow therefrom, a tiltable receptacle for receiving the stream of glass, the receptacle having an overflow lip for discharging the molten glass in the form of a comparatively wide thin stream, a pair of directing means which receive the latter glass stream, and arranged to cause it to flow between and around said means, means for drawing this glass downwardly in sheet form, and means for adjusting the directing means vertically.

8. In sheet glass apparatus, a receptacle including means for permitting a stream of molten glass to flow therefrom, a pair of similar directing members between and around which molten glass flows to form the sheet, the passage between the members being shaped to cause a greater flow of glass at the border portions of the sheet than at the center.

9. In an apparatus for producing sheet glass, a pair of similar directing members between and around which molten glass flows to form the sheet, the members varying in cross section symmetrically from their centers toward each end thereof to create a passage of a shape to cause a greater flow of glass to the border portions of the sheet than to the center.

10. The process of producing sheet glass, consisting of producing a mass of molten glass, permitting the same to overflow from its source downwardly, intercepting the downward flow of glass, and causing it to flow between and around directing members from which the glass is drawn away in sheet form, the glass having freer movement at the border portions than at the center.

11. The process of producing sheet glass, consisting in intercepting a downwardly moving stream of molten glass, and causing the glass to flow through a suitable passage which is relatively more restricted at the center than at the ends thereof to produce a uniform sheet of glass, the glass having freer movement at the border portions than at the center.

Signed at Toledo, in the county of Lucas, and State of Ohio, this 12th day of May 1924.

ENOCH T. FERNGRF